Nov. 25, 1969 D. E. NORTON 3,480,923

MEMORY DRIVING CIRCUIT

Filed Dec. 6, 1965 2 Sheets-Sheet 1

INVENTOR
DAVID E. NORTON

BY David W. Kuffsky

ATTORNEY

United States Patent Office 3,480,923
Patented Nov. 25, 1969

3,480,923

MEMORY DRIVING CIRCUIT

David Elliott Norton, Poughkeepsie, N.Y., assignor to International Business Machines Corporation, Armonk, N.Y., a corporation of New York Filed Dec. 6, 1965, Ser. No. 511,640
Int. Cl. G11b *5/00*
U.S. Cl. 340—174 8 Claims

ABSTRACT OF THE DISCLOSURE

A memory accessing system for selecting a magnetic core in a memory segment including conductive means associated with all magnetic cores of a memory segment. A gate means is operative to selectively apply gate potentials to the conductive means. The gate means is responsive to apply a first potential to a selected conductive means and a complementary potential to all other conductive means so as to allow full energizing current to flow in one direction through the selected conductive means and equal portions of said energizing current to flow in the opposite direction through the unselected conductive means.

Figure 1:
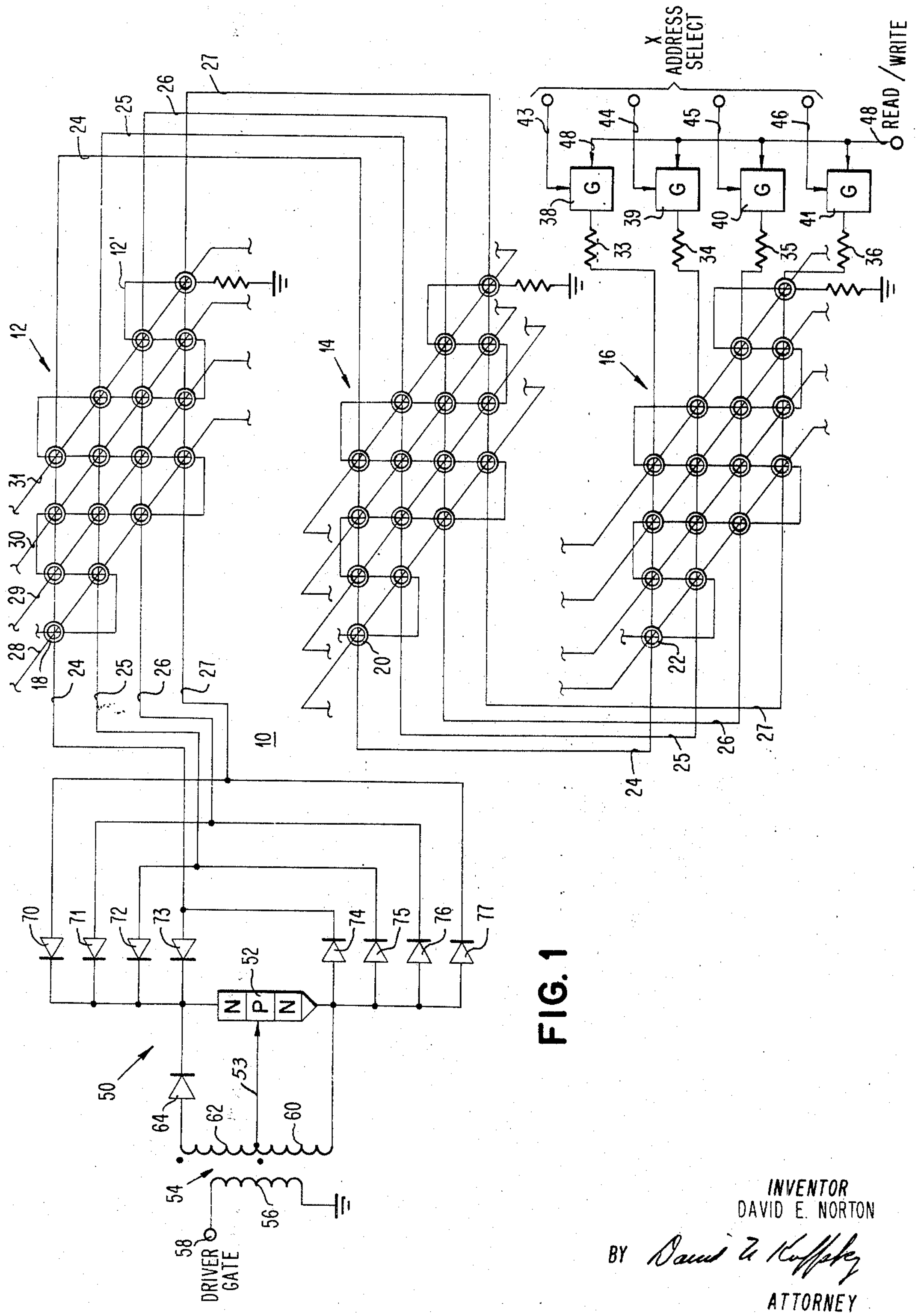

This invention relates to memory systems, and more particularly to a circuit arrangement for selecting and driving memory elements in a memory system.

In arrays of magnetic cores or other memory elements, it is common to use orthogonally oriented X and Y drive lines to provide the desired memory selection functions. Ordinarily, half-select currents are induced on specific X and Y drive lines to achieve, at the intersection of these lines, a full selection of the desired storage location.

A medium speed technique for energizing drive lines utilizes a gate at one end of each line. A read drive circuit is coupled in common at the other end of all the lines through diodes poled in one direction and a write drive circuit is coupled at the same end to the lines via oppositely poled diodes. To generate a read current on any drive line merely requires that the selected line's respectively connected gate be energized in such a manner as to provide a forward bias for the diode which connects the line to the read driver. This energization reverse biases the diode connecting selected lines to the write driver. Since only one gate is so energized, all other gates produce outputs which effectively reverse bias the diodes which connect their respective lines to the read driver thus effectively isolating them therefrom. Shortly after the energization of the specific gate, the read driver is energized and causes a read current to flow through the forward biased diode and selected drive line.

To cause a write current to flow in a selected drive line, the output states of the selected and nonselected gates are reversed so that the selected gate output forward biases the diode connecting the write driver to the selected drive line, while the outputs of the unselected gates reverse bias the diodes which connect their respectively associated drive lines to the write driver. Thus, when the write driver is energized, write current flows only in the selected drive line. Such a drive system is described in U.S. Patent 3,027,546.

Several problems occur with this type of drive system which act to degrade memory operation. First, should a failure in the selection circuit logic cause both the read and write drivers to turn on simultaneously, the connecting diodes provide a substantial short circuit between the drivers with a resultant destruction of either the diodes or the drivers. In addition, the transition of either the read or write driver from one energization state to another induces noncancelling noise signals on the sence lines thereby degrading the memory's operation. Moreover, the provision of separate read and write drivers adds significantly to the expense of the memory.

Accordingly, it is an object of this invention to provide an improved memory element selection arrangement.

It is another object of this invention to provide a memory selection arrangement which has inherent noise cancellation properties.

A further object of this invention is to reduce the number of memory drivers required for a memory element's selection.

In accordance with the above-stated objects, a three dimensional memory organization is utilized which has memory elements arranged to provide storage of data segments, and drive conductors associated with all memory elements in a segment. In lieu of providing separate read and write drivers for the memory, a single driver switch means is utilized with one of its terminals coupled via a plurality of unidirectional conductive means to the drive conductors and another of its terminals coupled to the same drive conductors via oppositely poled unidirectionally conductive means. The driver switch means is responsive to a control signal to provide a circuit path between its respective terminals. Gate means are coupled to the drive conductors and apply a first potential to a selected drive conductor and a complementary potential to all unselected drive conductors. These potentials bias the unidirectionally conductive means to allow a full energizing current flow in one direction through the selected drive conductor and equal portions of said energizing current to flow in the opposite direction through the unselected drive conductors, with the circuit connection between the selected and unselected drive conductors being made through the switch means.

The foregoing and other objects, features and advantages of the invention will be apparent from the following more praticular embodiment of the invention, as illustrated in the accompanying drawings.

In the drawings:

FIG. 1 is a schematic diagram of a memory embodying the invention.

Figure 3:
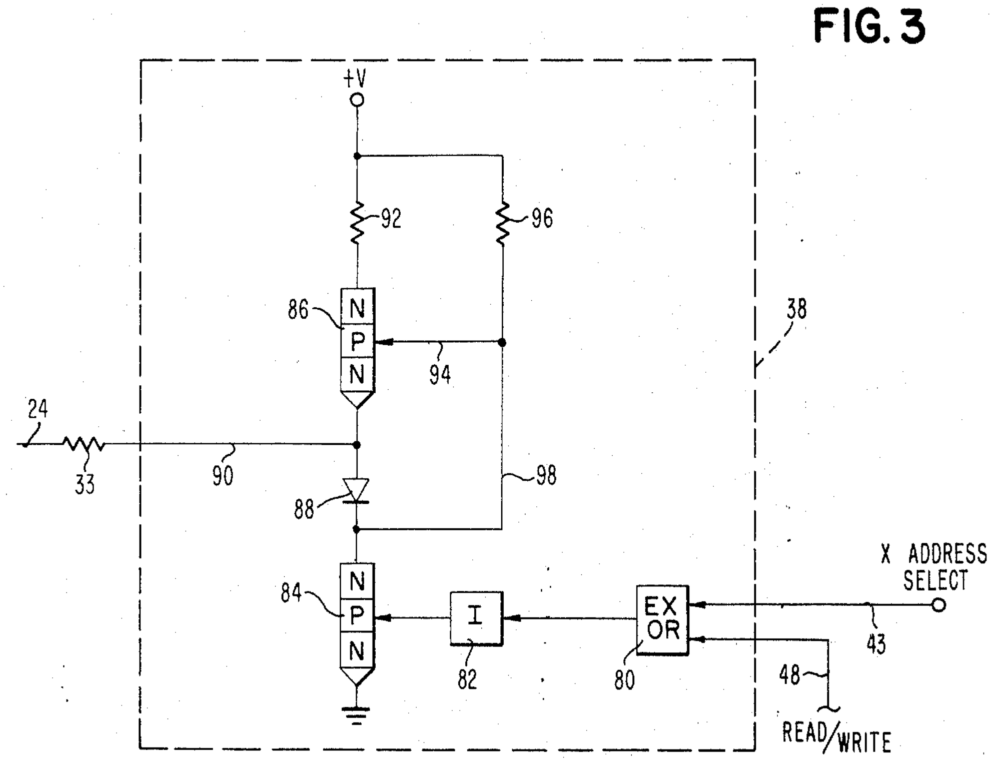
Figure 2:
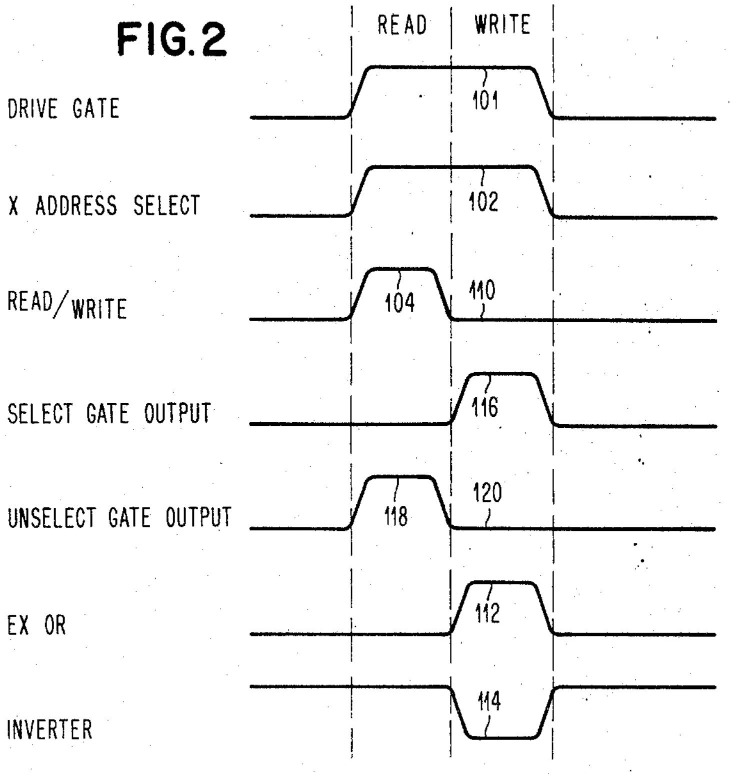

FIG. 2 contains waveform diagrams helpful in describing the operation of FIGS. 1 and 3.

FIG. 3 is a circuit diagram of a representative selection gate.

Referring now to FIG. 1 the invention is illustrated as being applied to a magnetic core matrix 10. It should be realized that the same selection technique can be applied to any memory matrix whether it be flat film, core, active storage elements, etc. In this example, magnetic core matrix 10 is comprised of three planes 12, 14, and 16, each of which contains a 4 x 4 matrix of magnetic cores. A particular word or segment of data is stored in vertically aligned cores, with memory matrix 10 having provision for storing sixteen separate three bit data words, e.g., a data word is stored in cores 18, 20, and 22. Each core is threaded by an X drive line (e.g., 24–27) with like rows of cores in planes 12, 14 and 16 being threaded by the same line. In a similar manner, Y drive lines (28–31) thread each column of cores and connect like columns in each of planes 12, 14, and 16. Hereinafter, only X drive lines 24–27 will be discussed, but it should be understood that the reason for omitting the detailed connections to Y drive lines 28–31 is for drawing simplicity and that in all respects, the connections and operations thereof are identical to X drive lines 24–27.

Each plane of memory array 10 is additionally provided with a sense line (e.g., 12′ in core plane 12) which is threaded through all cores in the plane. As is well known, when coincident half-select pulses are applied through specific X and Y drive lines, a selected core in each plane is switched and induces a signal on the sense line which is then detected as the data signal. To write data back into the memory positions requires that an extra "inhibit" winding be provided in addition to the X and Y drive lines. This winding has been omitted for clarity's sake.

Each of X drive lines 24–27 is respectively connected via terminating resistors 33–36 to selection gates 38–41. Each of selection gates 38–41 is provided with a pair of inputs, the first input being an X Address Select input applied via conductors 43–46, respectively, the second input being a Read/Write input which is applied to gates 38–41 in common via conductor 48. Each of selection gates 38–41 is adapted to generate one of two output potentials in response to the condition of its Read/Write input 48 and its particular X Address Selection input 43–46. If both inputs are simultaneously energized to a relatively positive ("up" logical level), or neither are energized (down level), the selected gate applies a down potential to its connected drive line. An up level energization applied to only one of the aforementioned inputs to a gate causes that gate to apply an up level to its connected drive line. As will become hereinafter apparent, the operation of the selected and unselected gates are complementary.

At the other extremity of each of X drive lines 24–27 is connected an X driver circuit 50. Transistor 52 forms the central element of X driver circuit 50 and has its base input 53 energized through transformer 54. Primary winding 56 of transformer 54 is energized through driver gate input terminal 58 during each read-write cycle of the memory. A current in primary winding 56 induces potentials across secondary windings 60 and 62 which bias transistor 52 for conduction. Diode 64 is connected between the collector of transistor 52 and secondary winding 62 for saturation prevention purposes. Each of X drive lines 24–27 is respectively connected through diodes 70–73 to the collector of driver transistor 52. These same X drive lines are also connected via oppositely poled diodes 74–77 to the emitter of driver transistor 52.

Referring now to FIGS. 1 and 2, the operation of the circuit shown in FIG. 1 will be described. A normal memory cycle is composed of two portions; a first portion during which data is read out from the memory to the sense amplifier; and a second portion immediately succeeding the first during which the data is either regenerated back into the memory or new data is inserted. To commence a memory cycle, driver gate input terminal 58 is energized by gating potential 101 (FIG. 2). This input renders transistor 52 conductive and connects the cathodes of diodes 70–73 to the anodes of diodes 74–77. Simultaneously, an up logical level is applied to one of the X Address Select input lines 43–46. If it is assumed that it is desired to select the data word including magnetic cores 18, 20, and 22 the up level X Address Select energization is applied to input terminal 43 to gate 38 (waveform 102). Concurrently with the application of the driver gating input to terminal 58 and the X Address Select up level to conductor 43, Read/Write line 48 is energized by an up logical level (waveform 104). The coincident applications of the X Address Select and Read/Write potentials induce gate 38 to apply a down potential via resistor 33 to drive line 24. The application of just the Read/Write up level energization to gates 39, 40, 41 results in their impressing up potentials via resistors 34, 35, and 36 upon drive lines 25, 26 and 27 respectively. The down level on drive line 24 is applied to the anode of diode 73 and the cathode of diode 74. The up levels on drive lines 25, 26 and 27 respectively are applied to the anodes of diodes 70, 71, and 72 and the cathodes of diodes 75, 76, and 77. As a result of these energizations, diodes 70, 71, and 72 are forward biased while diode 73 is reverse biased. Diode 74, on the other hand, is forward biased while diodes 75–77 are reverse biased. With the aforesaid diode bias states, currents flow in this system as follows: Equal currents flow from selection gates 39, 40, and 41 through resistors 34, 35, and 36 into drive lines 25, 26, and 27; thence through forward biased diodes 70, 71, and 72 where they combine into a full half-select current and pass through conductive transistor 52, forward biased diode 74 and into drive line 24. The half-select current traverses drive line 24 through cores 18, 20, and 22 and thence through resistor 33 into gate 38. In brief, therefore, the half-select current which passes through drive line 24 is made up of equal increments of currents which travel through drive lines 25–27 in the opposite direction. The result of these opposing current paths is to produce a "floating" system wherein the noise currents induced on each plane's sense line by the full half-select current is cancelled by the opposite direction noise currents induced by currents flowing in the unselected drive lines. The value of the currents appearing on the unselected drive lines is sufficiently small to not affect the remnant states of the unselected cores and, in a practical memory, are so small as to induce negligible disturbing influences.

During the second portion of the memory cycle, that is, the write portion, the X Address Select energization on conductor 43 remains unchanged, but the Read/Write energization on conductor 48 switches to the down level (waveform 110). Thus, in response to the lack of any up level energization, gates 39, 40, and 41 respectively apply down levels to their associated drive lines 25, 26, and 27. The up level X Address Select energization to gate 38 (waveform 102) results in an uplevel energization being applied to drive line 24. The up level appearing on drive line 24 is applied to the anode of diode 73 and biases it for conduction. This same potential reverse biases diode 74. The down potentials on drive lines 25, 26, and 27 respectively reverse bias diodes 70, 71, and 72 and forward bias diodes 75, 76, and 77. As a result of this action, a half-select current flows from gate 38, through resistor 33, drive line 24 (passing through cores 22, 20, and 18), through forward biased diode 73, conductive transistor 52 and then divides substantially equally between diodes 75, 76, and 77. From there, the 3 separate currents return via drive lines 25, 26, and 27 through resistors 34, 35, and 36 to gates 39, 40, and 41. Thus, after providing its half-select function, the half-select current divides among the unselected drive lines and is returned to ground.

It can thus be appreciated from the above described memory accessing operation, that the entire Read/Write operation is accomplished under the control of a single switching driver transistor and that by virtue of the opposing currents induced in the sense lines from the full selection current and its component return current, sense line noise is minimized. These two features result in significant improvements both in cost and noise tolerance for the memory.

Turning now to a description a representative selection gate, each of gates 38–41 is identical and contains the structure shown in FIG. 3. Taking gate 38 as an example, inputs thereto are provided via X Address-Select line 43 and Read/Write line 48. These inputs are applied to Exclusive OR circuit 80 phose output is, in turn, applied via inverter 82 to the base of transistor 84.

Transistors 84, 86, and diode 88 are connected in series and form a push-pull amplifier which, in accordance with the input level at the base of transistor 84, results in the potential on output conductor 90 varying between the afore-described up and down potential levels. The collector of transistor 86 is connected via resistor 92 to a source of collector potential +V. The conduction level of transistor 86 controlled via the potential at its base terminal 94, which potential is in turn controlled by the current flowing through shunt connected resistor 96 and conductor 98.

With reference now to the waveforms of FIG. 2, and assuming that gate 38 has been chosen to select its output drive line 24, the operation of the circuit will be described. At the start of the Read cycle, Up levels are applied to X Address Select line 43 and Read/Write line 48 as indicated by waveforms 102 and 104 respectively. Under these circumstances, the output of Exclusive OR circuit 80 is at the down logical level. This down level is converted to an up level by inverter 82 and applied to the base of transistor 84 to render it conductive. The conduction of transistor 84 clamps the base potential of transistor 86 to ground via conductor 98. This action prevents conduction in transistor 86 and forward biases diode 88 thereby applying the ground potential to output conductor 90. As a result, a low impedance path to ground ("down" potential) is provided for drive currents appearing on drive line 24.

During the next half of the cycle, that is, the write portion, the potential on Read/Write line 48 reverts to the down potential level (waveform 110) while the X Address Select potential on input line 43 remains at the up level. In response, Exclusive OR circuit 80 produces an up level (waveform 112) which is inverted by inverter 82 to a down potential level (waveform 114) to render transistor 84 nonconductive. The nonconduction of transistor 84 results in its collector rising towards +V, which in turn allows the base potential of transistor 86 to rise via conductor 98 and initiates conduction in transistor 86. The collector potential rise of transistor 84 also reverse biases diode 88 and isolates output line 90 from conductor 98 thereby preventing any disturbance of the feedback path by drive currents. The conduction of transistor 86 causes the potential on output conductor 90 to rise to substantially +V as indicated by waveform 116. Under these conditions, transistor 86 acts as an emitter follower stage and provides write current into output conductor 90 for drive line 24.

As aforesaid, the Read/Write energization levels are applied via conductor 48 to all of the gates whereas the X Address Select energization is applied only to a desired one of the gates. If the Read/Write up level energization is applied in the absence of an X Address Select energization, the so energized gate will produce an output as indicated by waveform 118 in FIG. 2. More specifically, the combined application of the up level Read/Write energization and down level X Address Select potential to Exclusive OR circuit 80 results in an up level input to inverter 82. The resulting down level from inverter 82 renders transistor 84 nonconductive and causes an up level to be applied to output line 90.

Likewise, when the Read/Write potential on conductor 48 traverses to the down level (waveform 110) the output from the Exclusive OR circuit 80 goes to the low level (waveform 120) causing an up level output from inverter 82. Transistor 84 is thereby rendered conductive with a resultant lowering of potential on output conductor 90. In effect, therefore, the outputs of all unselected gates are directly complementary to the output of the selected gate, that is, when the selected gate's output goes to the high or +V level, all unselected gates go to the ground level whereas when the selected gate's output traverses to the ground level, all unselected gates provide +V outputs.

In the description of this invention it has been assumed that both the driver gate signal and the selection signals are simultaneously applied. For a small memory configuration this is an acceptable technique; however, for larger arrays the combined gate and driver noise will mask the data signal. Under these conditions it is necessary to stagger the energizations of the gates and driver with the driver being last energized.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a memory accessing system for energizing memory elements in a chosen memory segment, the combination comprising:

conductive means associated with all memory elements of a memory segment, switch means having a pair of terminals, said switch means responsive to a control signal to provide a circuit path between said terminals, first unidirectional means coupled between one terminal of said switch means and each said conductive means, second oppositely poled unidirectional means coupled between a second terminal of said switch means and each said conductive means, gate means for selectively applying gate potentials to said conductive means when said control signal activates said switch means, said gate means applying a first potential to a selected conductive means and a complementary potential to all other conductive means, said applied potentials biasing said first and second unidirectional means to allow full energizing current flow in one direction through said selected conductive means and equal portions of said energizing current to flow in the opposite direction through said unselected conductive means.

2. The invention as defined in claim 1 further including signal means coupled to said gate means for reversing the gate potential states on said conductive means during said memory energization to achieve a reversal of the direction of current flow through said conductive means.

3. The invention as in claim 2 wherein the application by said gate means of said first potential to a conductive means biases said coupled first unidirectional means to a conductive state and said second unidirectional means to a nonconductive state, and the application of said complementary potential biases said second unidirectional means to a conductive state and said first unidirectional means to a nonconductive state.

4. The invention as in claim 3 wherein said switch means includes a semiconductor adapted to be switched from a conductive to nonconductive state vice versa in response to said control signal.

5. The invention as in claim 4 wherein each said first unidirectional means is a diode having its cathode connected to one terminal of said semiconductor and its anode connected to a conductive means and each said second unidirectional means is also a diode with its anode connected to a second terminal of said semiconductor and its cathode connected to a conductive means.

6. The invention as in claim 5 wherein said gate means comprises:

a separate gate coupled to each one of said conductive means, each said gate responsive to either a Read/Write signal or a Select signal to produce a first potential output on its connected conductive means and further responsive to the presence or absence of both said signals to produce a second output potential.

7. The invention as in claim 6, wherein said signal means, during a read portion of the memories operation provides both said Read/Write signal and said Select signal to a selected gate and only said Read/Write signal to all other gates, and during a subsequent write portion of said memories operation provides only said Select signal to said selected gate and no signals to said unselected gates.

8. The invention as in claim 7 wherein said memory is a 3-dimensional core memory and said conductive means further comprises X and Y drive lines which thread their respective common columns and rows of cores in the planes of said memory for providing full coordinate selection of any core in said memory.

References Cited

UNITED STATES PATENTS 3,192,510 6/1965 Flaherty ---------- 340—174

BERNARD KONICK, Primary Examiner

KENNETH E. KROSIN, Assistant Exaimner

U.S. Cl. X.R.

307—270